(12) United States Patent
Tomescu et al.

(10) Patent No.: US 11,108,302 B2
(45) Date of Patent: Aug. 31, 2021

(54) ELECTRIC GENERATOR HAVING A LIQUID COOLANT SYSTEM

(71) Applicant: PRATT & WHITNEY CANADA CORP., Longueuil (CA)

(72) Inventors: Dana Tomescu, Brampton (CA); Daniel Alecu, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 77 days.

(21) Appl. No.: 16/365,229

(22) Filed: Mar. 26, 2019

(65) Prior Publication Data

US 2020/0313514 A1 Oct. 1, 2020

(51) Int. Cl.
| | | |
|---|---|---|
| H02K 9/19 | (2006.01) |
| H02K 7/00 | (2006.01) |
| H02K 7/14 | (2006.01) |
| F04D 29/12 | (2006.01) |
| F04D 3/02 | (2006.01) |
| F04D 7/00 | (2006.01) |

(52) U.S. Cl.
CPC .............. *H02K 9/19* (2013.01); *F04D 3/02* (2013.01); *F04D 7/00* (2013.01); *F04D 29/126* (2013.01); *H02K 7/003* (2013.01); *H02K 7/14* (2013.01)

(58) Field of Classification Search
CPC . H02K 9/19; H02K 7/003; H02K 7/14; F04D 29/126; F04D 3/02; F04D 7/00; F04D 29/106
USPC .............................. 310/52, 54, 60 A, 62, 63
See application file for complete search history.

(56) References Cited

U.S. PATENT DOCUMENTS

| | | | |
|---|---|---|---|
| 4,276,482 A * | 6/1981 | Crockett | ................. F03B 13/10 |
| 8,760,014 B2 | 6/2014 | Birdi | |
| 9,148,041 B2 | 9/2015 | Knoblauch | |
| 2004/0134693 A1* | 7/2004 | Yamagishi | ............... H02K 9/19 |
| | | | 180/65.1 |
| 2011/0169353 A1* | 7/2011 | Endo | ........................ H02K 9/19 |
| | | | 310/59 |
| 2013/0038151 A1* | 2/2013 | Ohashi | ................. H02K 5/1737 |
| | | | 310/59 |
| 2018/0351434 A1 | 12/2018 | Knoblauch et al. | |
| 2020/0220431 A1* | 7/2020 | Wrighton | ............... H02K 7/083 |
| 2020/0313514 A1* | 10/2020 | Tomescu | ................ H02K 7/003 |

* cited by examiner

*Primary Examiner* — John K Kim
(74) *Attorney, Agent, or Firm* — Norton Rose Fulbright Canada

(57) ABSTRACT

A machine includes a liquid system and a shaft. The shaft is rotatable about a rotation axis and includes a first part and a second part engaged coaxially with the first part. The first part is rotatable relative to the second part about the rotation axis to define a liquid pump between the first part and the second part. The pump is hydraulically connected to the liquid system. A method of cooling the machine is also provided.

10 Claims, 7 Drawing Sheets

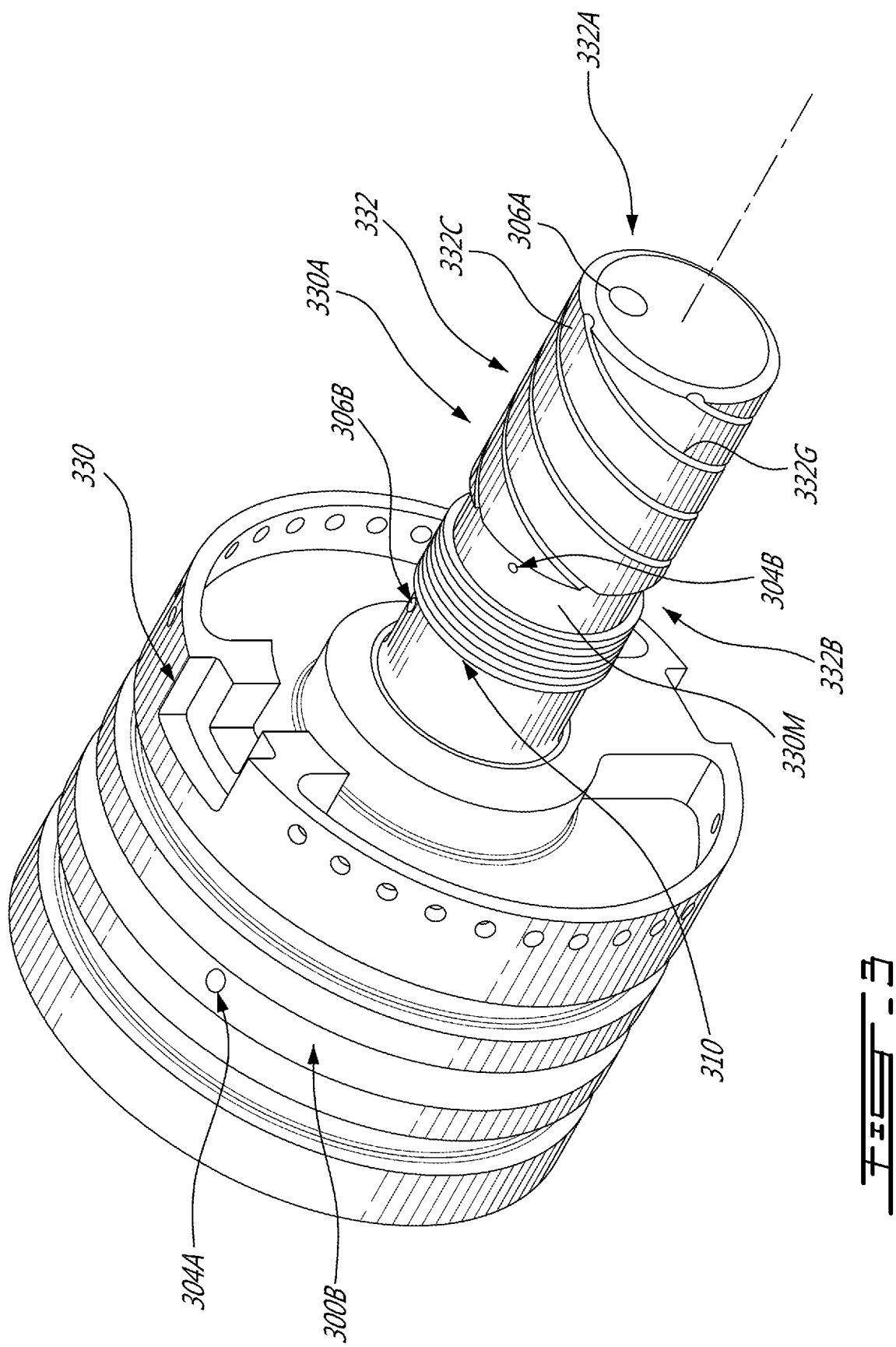

ELECTRIC GENERATOR HAVING A LIQUID COOLANT SYSTEM

TECHNICAL FIELD

The application relates to electric generators having a liquid coolant system.

BACKGROUND

Prior art machines, such as electric generators and aircraft engines, typically have parts that require cooling arrangements and bearing assemblies to facilitate operation. Prior art machines typically use cooling and bearing systems that are suitable for their purposes, but that may be relatively complex and/or expensive to manufacture and/or assemble and/or maintain. Therefore, improvements to prior art bearing and/or cooling systems are possible and desirable.

SUMMARY

In one aspect, the present technology provides a electric generator machine comprising a liquid coolant system and a shaft, the shaft being rotatable about a rotation axis, the shaft including a first part and a second part engaged coaxially with the first part, the first part being rotatable relative to the second part about the rotation axis with a helical feature disposed between the first part and the second part to define a helical pump between the first part and the second part, the pump being hydraulically connected to the liquid coolant system.

In some such embodiments, the first part defines an axial channel therein, the axial channel including an opening in an end of the first part, and the second part is received in the axial channel via the opening.

In another aspect, the present technology provides a machine comprising a liquid system and a shaft, the shaft being rotatable about a rotation axis, the shaft including a first part and a second part engaged coaxially with the first part, the first part being rotatable relative to the second part about the rotation axis to define a liquid pump between the first part and the second part, the pump being hydraulically connected to the liquid system.

In some embodiments, the first part defines an axial channel therein, the axial channel including an opening in an end of the first part, the second part is received in the axial channel via the opening, at least one of the first part and the second part including a helical feature disposed between the first part and the second part.

In some embodiments, the helical feature includes a helical groove.

In some embodiments, the helical feature includes a helical fin.

In some embodiments, the second part defines a liquid channel therethrough, the liquid channel hydraulically connecting the liquid system to the axial channel.

In some embodiments, the liquid system is a lubrication system of the machine, and the second part defines a priming lubricant channel therethrough that hydraulically connects the lubrication system to an outer surface of the second part at a location facing an inner surface of the first part.

In some embodiments, the second part defines an air vent channel therethrough, the air vent channel being at one end open to the axial channel and at another end being open at a location in the second part that is disposed outside of the first part.

In another aspect, the present technology provides a machine comprising a liquid system and a shaft, the shaft including a first part and a second part, the first part defining an axial channel therein, the axial channel defining an opening in an end of the shaft, the axial channel being hydraulically connected to the liquid system, the second part being received in the axial channel via the opening, at least one of the first part and the second part including a helical feature disposed between the first part and the second part, the first part and the second part being coaxial with a rotation axis and being rotatable relative to the second part about the rotation axis, rotation of the first part relative to the second part about the rotation axis causing liquid from the liquid system to move through the axial channel via the helical feature.

In some such embodiments, the second part defines a liquid channel therethrough, the axial channel being hydraulically connected to the liquid system via the liquid channel.

In some such embodiments, the liquid channel extends from an opening defined in a base of the second part to an opening defined in an appendix of the second part, the base being at least in part disposed outside of the first part, the appendix being received in the axial channel and defining a space between the appendix and an inner surface of the first part, the space being part of the axial channel, the opening defined in the appendix being open to the space.

In some such embodiments, the space is seal-free and bearing-free.

In some such embodiments, the helical feature is disposed at least in part inside the space, and the helical feature includes at least one of a helical groove and a helical fin.

In some such embodiments, the space extends from the helical feature toward the base of the second part, the base being disposed at least in part outside of the first part, and the shaft further includes a seal that hydraulically seals the space at a location between the helical feature and the base.

In some such embodiments, the seal is a labyrinth seal defined by one of the second part and the inner surface of the first part.

In some such embodiments, the second part defines a priming lubricant channel therethrough, the priming lubricant channel being at one end open to the space at a location between the seal and the helical feature, and at another end being open at an outer surface of the second part at a location outside of the first part.

In some such embodiments, the second part defines an air vent channel therethrough, the air vent channel being at one end open to the axial channel inside the first part and at another end being open at an outer surface of the second part at a location outside of the first part.

In yet another aspect, the present technology provides a machine comprising a shaft and a lubrication system containing a lubricant, the machine being one of an electric generator, an engine starter, and an aircraft engine, the shaft comprising a first part and a second part engaging the first part, the first and second parts being coaxial, the first part being rotatable relative to the second part about a rotation axis, at least one of the first part and the second part including a helical feature disposed between the first part and the second part, rotation of the first part about the rotation axis relative to the second part moving at least part of the lubricant through the first part of the shaft.

In some such embodiments, the machine comprises a machine frame, the machine frame supporting the second part of the shaft such that the second part is at least one of i) pivotable or rotatable relative to the machine frame about the rotation axis, and ii) movable relative to the machine frame along the rotation axis.

In some such embodiments, the helical feature includes a helical groove defined in at least one of the first part and the second part.

In some such embodiments, the helical feature includes a helical fin disposed on one of the first part and the second part and extending circumferentially about the rotation axis.

In yet another aspect, the present technology provides a method of cooling an electric generator, comprising operating the electric generator, with heat generated by the electric generator being transferred into a liquid in a liquid cooling system, and rotating a first part of a shaft of the electric generator about a rotation axis relative to a second part of the shaft with a helical feature being disposed between the first part and the second part to define a helical pump between the first part and the second part, the rotating the first part causing the helical pump to circulate at least some of the liquid through the first part of the shaft.

In some embodiments, the rotating the first part of the shaft causes the helical pump to circulate at least some of the liquid through the liquid cooling system.

In some embodiments, the method includes, before the rotating the first part of the shaft, pressurizing at least part of the liquid cooling system to move at least some of the liquid into an interface between the first part and the second part of the shaft and thereby priming the interface.

In some such embodiments, the priming the interface includes supplying the at least some of the liquid into the interface via a channel defined through the second part of the shaft.

DESCRIPTION OF THE DRAWINGS

Reference is now made to the accompanying figures in which:

FIG. 2D is a cross-sectional view of the end portion of FIG. 2A, taken along plane D-D in FIG. 2A;

FIG. 3 is a schematic perspective view showing an alternative embodiment of the end portion of FIG. 2A.

DETAILED DESCRIPTION

For the purposes of the present description, the term "fuel conduit" is used to describe an arrangement of one or more elements, such as one or more hoses, connectors and other elements, that together form a flow path or flow paths for a liquid fuel to flow from point A to point B. For example, a given fuel conduit may be defined by any number and combination of hoses or tubes hydraulically interconnected in parallel and/or series, by or with one or more fuel filters, switches, pumps, nipples, tees, and the like.

Figure 1:
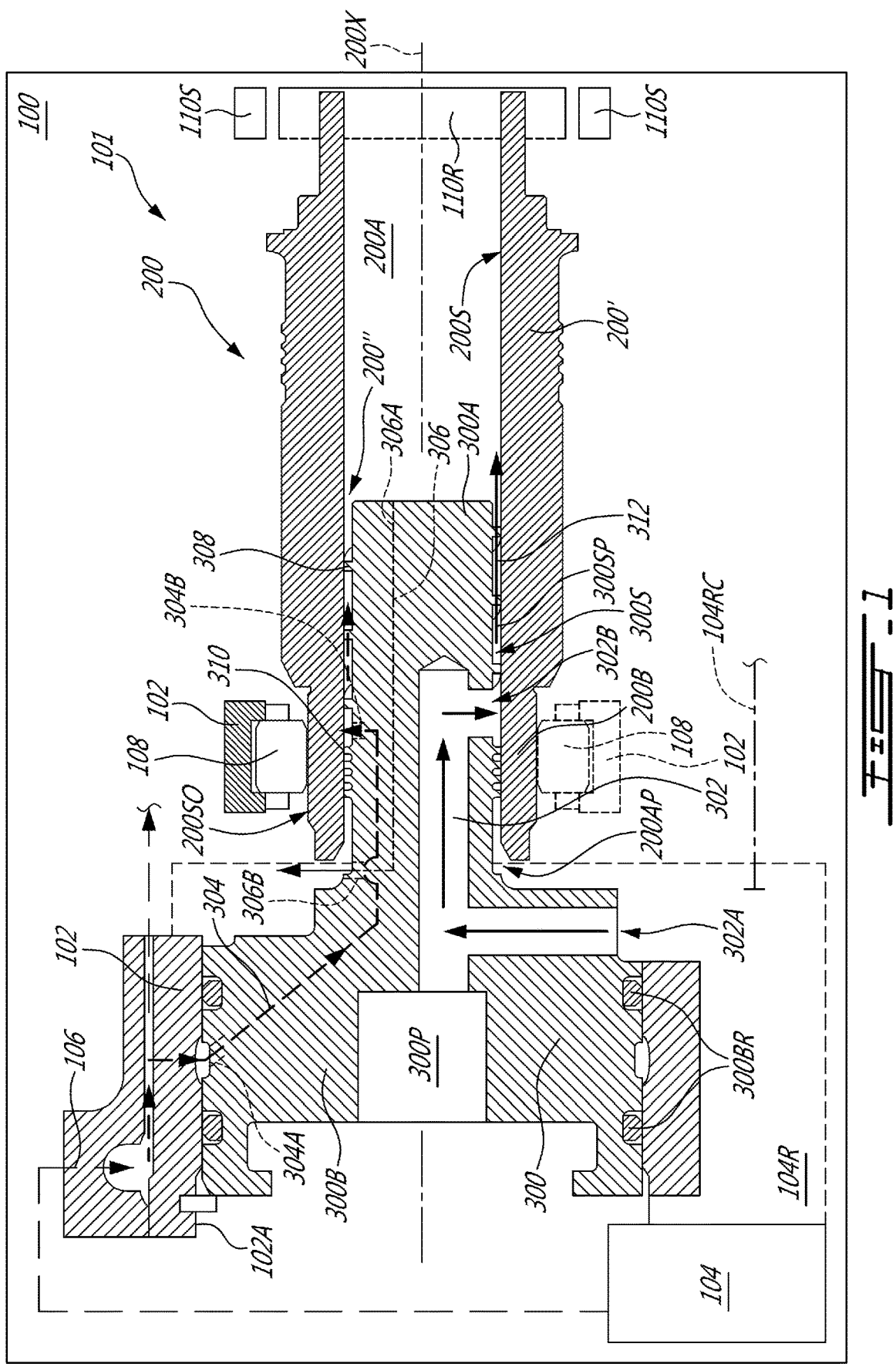
FIG. 1 is a schematic side view showing a machine having a liquid system circulating a liquid.

FIG. 1 schematically shows an auxiliary power unit (APU) 100 for an aircraft. It is contemplated that the APU 100 could be of any given APU type that uses at least one rotatable shaft requiring lubrication and/or cooling. The APU 100 is one particular example of a machine with respect to which, or in which, the present technology could be used. It is contemplated that the present technology could be used with a different type of machine that uses one or more rotatable shafts.

For example, it is contemplated that the APU 100, and more particularly the machine 100 in which the present technology could be used, could instead be an engine (an aircraft engine for example), an electric motor, an electric pump, a hybrid fuel/electric motor or pump, a pneumatic or hydraulic motor or pump, an electric generator, a gearbox and the like. One particular example of an electric motor is a starter for an engine.

The APU 100 includes a machine frame 102 supporting various components of the APU 100, a liquid system 104 (which in the present embodiment is a lubrication system 104) that contains a liquid (in the present embodiment, a lubricant, and more particularly an oil), a rotor 110R and a stator 110S for generating electricity. In the present embodiment, the lubrication system 104 lubricates and/or cools various components of the APU 100. In other embodiments, the system 104 may be a different liquid system. For example, in embodiments where the element/machine 100 is an electric generator, the system 104 is a liquid cooling system of the electric generator. In some such embodiments, the liquid cooling system 104 uses a lubricant such as oil, but other liquids are also contemplated.

As schematically shown in FIG. 1, a shaft assembly 101 is installed in the APU 100 as a part thereof. It is contemplated that a different type of lubricant or a different type of liquid could be used depending on each particular embodiment and application of the shaft assembly 101 and/or the particular embodiment and application of the machine in which the shaft assembly 101 is used. In the present embodiment, the shaft assembly 101 includes a bearing assembly 108 and a shaft 200. The shaft 200 includes a first part 200' and an end portion 300. As described in more detail below, the first part 200' and the end portion 300 define a liquid pump 200" therebetween. In the the present embodiment, the liquid pump 200" is a lubricant pump that circulates at least part of the lubricant in the lubrication system 104 of the APU 100. In other embodiments, the liquid pump 200" circulates other liquids for other purposes, such as circulating a liquid for cooling one or more parts of the machine with which it is used.

In other embodiments, such as where the APU 100 is instead an engine, the pump 200" may be a recirculation pump that lubricates components of the engine and recirculates oil through the lubrication system 104 of the engine. In yet other embodiments, such as where the APU 100 is instead an electric motor, the pump 200" may be a scavenge pump that scavenges oil to a gearbox associated with the electric motor, thereby evacuating hot oil and cooling the electric motor. In such other embodiments, the shaft 200 may serve a different one or more purposes than the purposes described herein with respect to the APU 100 application.

Referring to FIG. 1, in the present embodiment, the first part 200' of the shaft 200 is rotatably supported by the machine frame 102 by the bearing assembly 108 and the end portion 300 to rotate about a rotation axis 200X. The first part 200' of the shaft 200 is connected to the rotor 110R to rotate the rotor 110R about the rotation axis 200X relative to the stator 110S.

The first part 200' of the shaft 200 is also connected to a power source (not shown) using a connection suitable to the particular embodiment and application of the APU 100 and is driven by the power source to rotate relative to the stator 110S. In other embodiments of the present technology in which the APU 100 is a different machine, the first part 200' of the shaft 200 may be connected to a different one or more elements of the machine and/or to one or more elements that are not part of the machine.

In some embodiments, the power source may be a turbine engine for example. It is contemplated that the power source could be internal or external to the APU 100, or other machine in/with which the shaft assembly 101 is used. It is contemplated that a different power generation assembly/arrangement could be used instead of or in addition to the rotor 110R and the stator 110S. It is contemplated that the APU 100 could have additional and/or other shafts that could be implemented according to the present technology as it is described in this document.

Still referring to FIG. 1, an inner surface 200S of the first part 200' of the shaft 200 defines an axial channel 200A through at least part of the first part 200' of the shaft 200. The axial channel 200A may be hydraulically connected to one or more parts of the APU 100 (or other machine with which the present technology is used) to supply liquid (in this embodiment, lubricant) thereto and to thereby lubricate and/or cool the one or more parts. As shown, the axial channel 200A defines an opening 200AP in an end 200B of the first part 200' of the shaft 200.

The end portion 300 of the shaft 200 is received in the first part 200' of the shaft 200 in the axial channel 200A via the opening 200AP such that the first part 200' of the shaft 200 is rotatable relative to the end portion 300 about the rotation axis 200X. In the present embodiment, the first part 200' of the shaft 200 is rotatable over the end portion 300. In other embodiments, the end portion 300 is disposed over the first part 200' of the shaft 200.

Figure 2A:
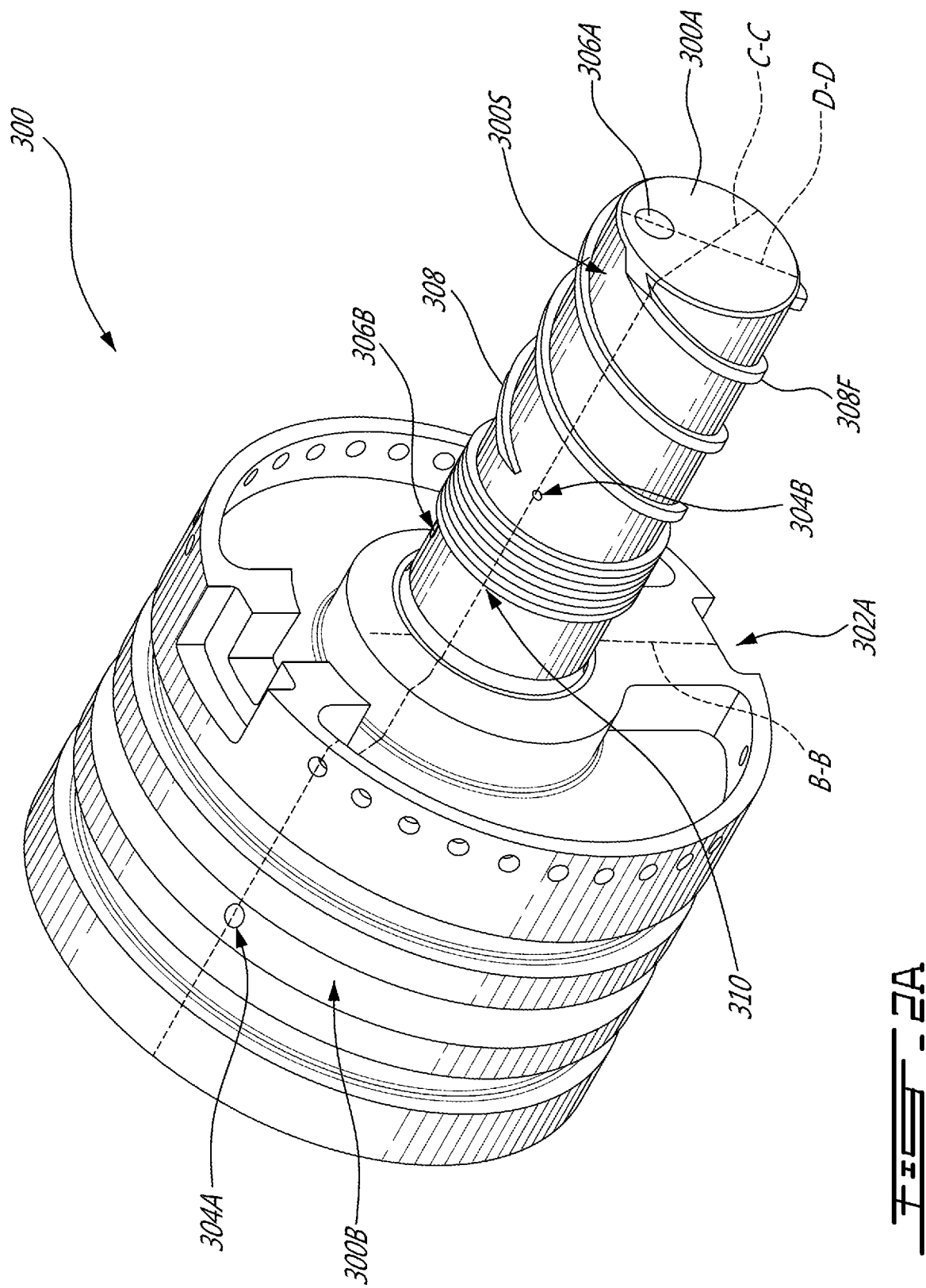
FIG. 2A is a schematic perspective view showing a shaft of the machine of FIG. 1, the shaft having an end portion.

In the present embodiment, and now referring also to FIG. 2A, the end portion 300 includes a cylindrical appendix 300A that is received in the axial channel 200A of the shaft 200, and a base 300B attached to an outer end (not labeled) of the appendix 300A. It is contemplated that the part 300A received in the axial channel 200A could have a different shape, so long as the functionality described in this document is achieved. In the present embodiment, the base 300B is integral with the appendix 300A, but they may be separate interconnected components as well. In the present embodiment, the base 300B is cylindrical in shape. It is contemplated that the base 300B could have a different shape.

Figure 2B:
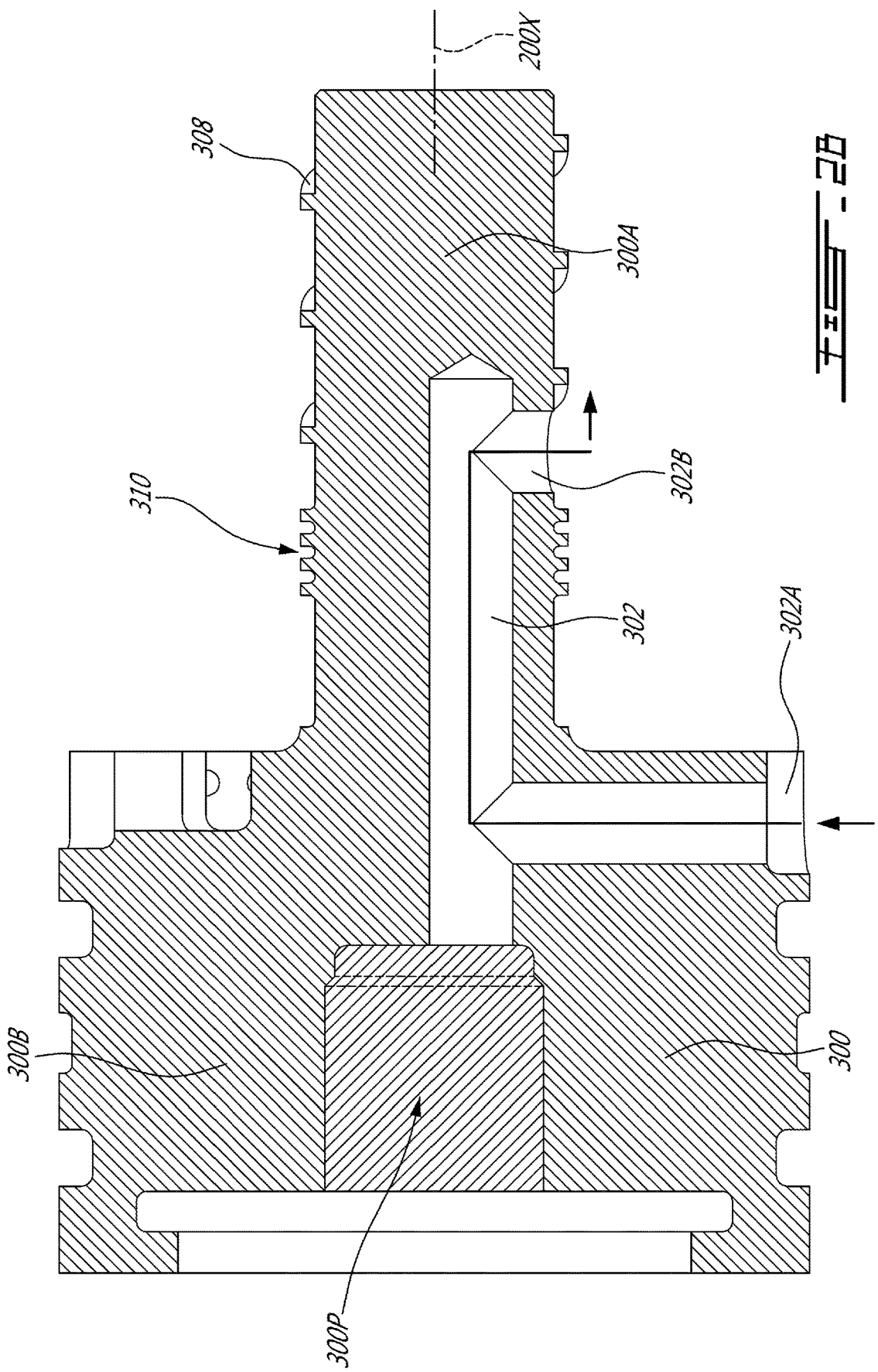
FIG. 2B is a cross-sectional view of the end portion of FIG. 2A, taken along plane B-B in FIG. 2A.

As schematically shown in FIG. 1, and in FIG. 2B, the end portion 300 defines therethrough a lubricant channel 302 along plane B-B shown in FIGS. 2A and 2B. In the present embodiment, the lubricant channel 302 serves to convey lubricant from the lubrication system 104 into the axial channel 200A and then to one or more components of the APU 100 via the shaft 200 at least when the shaft 200 rotates about the rotation axis 200X relative to the end portion 300. It is contemplated that to this end, the shaft 200 could have suitable apertures and/or conduits for delivering lubricant to the one or more components of the APU 100. It is contemplated that in some such embodiments, lubricant may return to the lubrication system 104 via one or more suitable return conduits 104RC.

The lubricant channel 302 includes an opening 302A that serves as an inlet in the present embodiment. As schematically shown in FIG. 1, the opening 302A is defined in a part (not labeled) of the end portion 300 that is disposed outside of the shaft 200. The opening 302A is hydraulically connected to a lubricant cavity 104R of the lubrication system 104 to receive lubricant therefrom and to make the lubricant available to the pump 200". In the present embodiment, the base 300B of the end portion 300 is at least in part disposed inside the lubricant cavity 104R. It is contemplated that the base 300B could be positioned entirely outside of the lubricant cavity 104R and could be hydraulically connected thereto by a lubricant conduit extending from the opening 302A to the lubricant cavity 104R.

As shown in FIG. 1, in the present embodiment, the lubricant channel 302 extends through the end portion 300 from the opening 302A to an opening 302B defined in the appendix 300A. The lubricant channel 302 may extend in a same direction as the rotation axis 200X. The opening 302B in this embodiment serves as an outlet and faces the inner surface 200S of the shaft 200. As explained in more detail below, at least when the shaft 200 rotates about the rotation axis 200X relative to the end portion 300, the opening 302B supplies lubricant into an annular space 300SP defined between the inner surface 200S of the shaft 200 and the outer surface 300S of the end portion 300. In the present embodiment, an axis of the opening 302B is radial to the inner surface 200S, but could instead be angled relative thereto. In some embodiments, the opening 302A is angled to make the liquid path through the lubricant channel 302 less arduous.

Still referring to FIG. 1, in the present embodiment, the lubricant channel 302 includes at least an axial portion (not separately labeled) that may extend in parallel to the rotation axis 200X. Stated different a central axis of the lubricant channel 302 may be parallel to the rotation axis 200X. As shown, this axial portion is closed off by a plug 300P. This construction facilitates manufacturing the end portion 300, as it allows the axial portion of the lubricant channel 302 to be drilled into the end portion 300 from the outer end of the end portion 300, with the outer end then being closed off by the plug 300P. It is contemplated that a different manufacturing method could be used to produce the end portion 300 and the various channels therethrough as the channels are described in this document.

Now referring to both FIG. 1 and FIG. 2A, the end portion 300, and more particularly the appendix 300A thereof defines a helical feature 308 that moves lubricant from the lubricant cavity 104R and moves the lubricant into the axial channel 200A of the shaft 200 via the lubricant channel 302 when the shaft 200 rotates about the rotation axis 200X relative to the end portion 300.

As best shown in FIG. 2A, in the present embodiment the helical feature 308 is at least one helical fin 308F that extends circumferentially about the outer surface 300S of the appendix 300A and about the rotation axis 200X. In other embodiments, the helical feature 308 is at least one helical groove (e.g. see groove 332G in FIG. 3). It is contemplated that in other embodiments, the helical feature 308 could include a combination of one or more fins and one or more grooves.

It is also contemplated that the helical feature 308 could be defined by, or could be disposed on, in part or in whole, the inner surface 200S of the first part 200' of the shaft 200. It is also contemplated that in embodiments in which the end portion 300 is disposed over the first part 200' of the shaft 200, the helical feature 308 could be defined by an outer surface 200SO of the first part 200' of the shaft 200 and/or by an inner surface of the end portion 300 to provide the functionality described in this document.

Also, in some embodiments, the helical feature 308 could be structured to move liquid from the axial channel 200A out of the shaft 200 via the lubricant channel(s) 302. In such embodiments, the opening 302B of the lubricant channel 302 serves as an inlet and the opening 302A of the lubricant channel 302 serves as an outlet.

As best shown in FIG. 2A, in the present embodiment, the at least one fin 308F is disposed inside the axial channel 200A of the shaft 200 circumferentially about the rotation axis 200X. As shown, the at least one fin 308F is a helical fin that is rectangular in cross-section and extends radially outward from the outer surface 300S of the appendix 300A. In other embodiments, the fin(s) 308F may have a different cross sectional shape and/or may be a separate part(s) attached to the appendix 300A. It is contemplated that a different number and/or pitch (spacing) of fin(s) 308F could be used depending on each particular embodiment and application of the shaft assembly 101.

In the present embodiment, the appendix 300A of the end portion 300 and the helical feature 308 are coaxial with the first part 200' of the shaft 200. It is contemplated that the helical feature 308 could be of a different type of element that moves lubricant when the first part 200' of the shaft 200 rotates relative to the end portion 300 about the rotation axis 200X. It is contemplated that the helical feature 308 (e.g. the one or more fins) could be manufactured separate from the end portion 300 and attached/fixed to the end portion 300.

It is contemplated that the helical feature 308 could instead be defined by the inner surface 200S of the shaft 200 and that in some such embodiments the corresponding portion of the appendix 300A could be smooth and free from fins and grooves. It is also contemplated that multiple helical features 308 could be used. In some such embodiments, it is contemplated that the helical features 308 could be in series, with at least one of the helical features 308 defined by the first part 200' of the shaft 200 and at least another one of the helical features 308 defined by the end portion 300.

In the present embodiment, the helical feature 308 is smaller in diameter than the inner diameter of the axial channel 200A of the shaft 200, so that there is a space between the helical feature 308 and the inner surface 200S of the first part 200' of the shaft 200. This allows the first part 200' of the shaft 200 to rotate freely over the helical feature 308 and the end portion 300 and to thereby operate the helical feature 308 to move lubricant into and through the axial channel 200A. In the present embodiment, this space, and the rest of the annular space 300SP defined between the inner surface 200S of the shaft 200 and the outer surface 300S of the end portion 300, is seal-free and bearing-free.

The shaft 200 may further include an annular seal 310 disposed between the helical feature 308 and the end 200B of the first part 200' of the shaft 200 that receives the end portion 300. The seal 310 at least substantially hydraulically seals the end 200B of the first part 200' of the shaft 200. In the present embodiment, the seal 310 is a labyrinth seal 310 defined by the outer surface 300S of the end portion 300. In the present embodiment, the seal 310 is integral to the rest of the end portion 300 and is smaller in diameter than the inner diameter of the axial channel 200A of the first part 200' of the shaft 200, so that there is a minute gap/space between the seal 310 and the inner surface 200S of the shaft 200, allowing the first part 200' of the shaft 200 to freely rotate over the helical feature 308.

It is contemplated that the seal 310 could be a different seal, such as one or more carbon seals on a surface of the first part 200' of the shaft 200 for example. It is contemplated that the seal 310 could be manufactured separate from the end portion 300 and attached/fixed to the end portion 300. It is also contemplated that the seal 310 could be defined by the inner surface 200S of the first part 200' of the shaft 200. It is also contemplated that multiple seals 310 could be used.

Figure 2C:
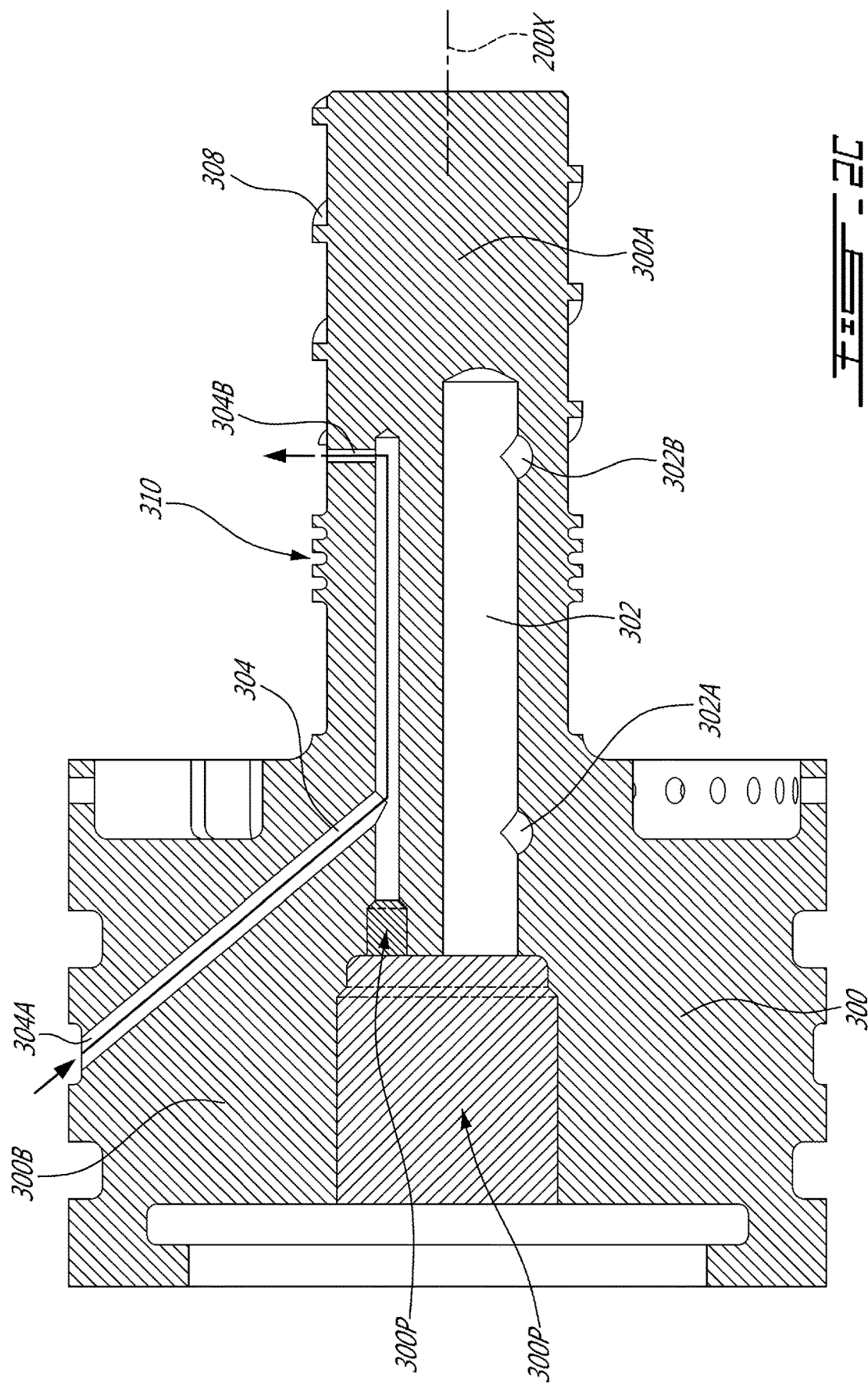
FIG. 2C is a cross-sectional view of the end portion of FIG. 2A, taken along plane C-C in FIG. 2A.
Figure 20:
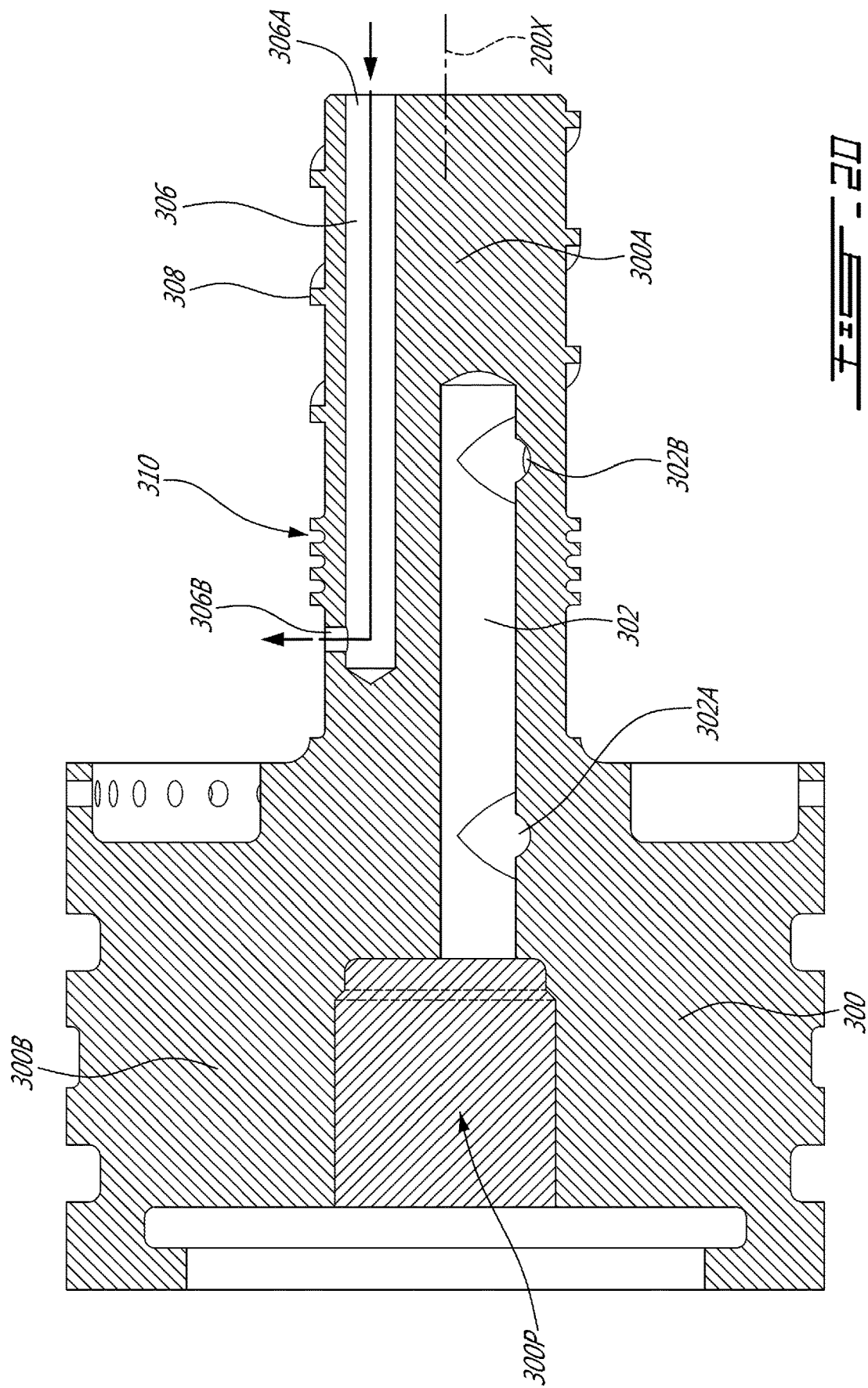

As schematically shown in FIG. 1, and in FIG. 2C, the end portion 300 further defines therethrough a priming lubricant channel 304 along plane C-C shown in FIGS. 2A and 2C. The priming lubricant channel 304 includes an opening 304A that is hydraulically connected to a liquid conduit 106 of the lubrication system 104 and serves as an inlet to the priming lubricant channel 304 in the present embodiment. As shown in FIG. 1, the liquid conduit 106 is defined at least in part by the machine frame 102 and supplies lubricant to various one or more parts of the APU 100 in addition to supplying priming lubricant to the priming lubricant channel 304. In some cases, at least part of the lubrication system 104 is pressurized prior to rotating the first part 200' of the shaft 200 to move at least some lubricant from the lubrication system 104 into the interface between the first part 200' and the end portion 300 to prime the interface and the pump 200".

It is contemplated that the liquid conduit 106 could be defined in any suitable way and/or in any suitable part(s) of the APU 100. It is contemplated that the liquid conduit 106 could hydraulically connect to any suitable part of the lubrication system 104. It is contemplated that the lubrication system 104 could include one or more liquid return conduits for recirculating at least some of the lubricant supplied to one or more components of the APU 100. It is also contemplated that the liquid conduit 106 could be part of a lubrication system that is separate from, or otherwise redundant to, the lubrication system 104.

The lubrication system 104 is shown as being internal to the APU 100. It is contemplated that a given machine, such as the APU 100, that implements the present technology as described herein, could have/use an external lubrication system instead of or in addition to an internal lubrication system. It is also contemplated that in some embodiments, and depending on the particular application of the present technology and/or the particular type of machine with which the present technology is used for example, the lubrication system 104 could instead be a cooling system and that accordingly the lubricant may be a different type of liquid pumped/moved by the helical feature(s) 308 of the shaft 200. Yet other liquid systems and/or liquids are also contemplated.

In the present embodiment, and as shown in FIGS. 1 and 2C, the priming lubricant channel 304 extends from the opening 304A to an opening 304B defined in the appendix 300A, via the base 300B and the appendix 300A of the end portion 300. The opening 304B in this embodiment serves as an outlet from the priming lubricant channel 304. The opening 304B opens into the annular space 300SP defined between the inner surface 200S of the shaft 200 and the outer surface 300S of the end portion 300, and faces the inner surface 200S of the first part 200' of the shaft 200. In the present embodiment, an axis of the opening 304B is radial to the inner surface 200S, but it could be angled relative thereto.

As shown in FIG. 1, the opening 304B is disposed at the outer surface 300S of the end portion 300 between the helical feature 308 and the seal 310. In the present embodiment, the lubrication system 104 is adapted to supply lubricant into the annular space 300SP defined between the inner surface 200S of the first part 200' of the shaft 200 and the outer surface 300S of the end portion 300 at least when the shaft 200 is stationary relative to the end portion 300. The priming lubricant channel 304 thereby primes the interface between the helical feature 308 and the inner surface 200S of the shaft 200 with lubricant, independent of whether or not the shaft 200 is rotating relative to the end portion 300. It is contemplated that in some embodiments, the priming lubricant channel 304 could be omitted.

Still referring to FIG. 1, in the present embodiment, the end portion 300 is supported in the machine frame 102 of the APU 100 by being received in an aperture 102A defined through a part of the machine frame 102. As schematically shown in FIG. 1, the aperture 102A is cylindrical in shape and is coaxial with the shaft 200. Also as shown, the end portion 300 is received in the aperture 102A and into the axial channel 200A. A pair of annular seals 300BR received in corresponding annular grooves (not labeled) that are likewise coaxial with the shaft 200, hydraulically seal the interface between the outer surface of the base 300B of the end portion 300 and the surface of the machine frame 102 defining the aperture 102A.

The seals 300BR thereby prevent priming oil from leaking out from the interface between the base 300 and the frame 102. In the present embodiment, the base 300B of the end portion 300 is smaller in diameter than the diameter of the aperture 102A in which the base 300B is received, thereby allowing some translational movement between the end portion 300 and the machine frame 102 along the rotation axis 200X of the shaft 200 and/or some pivoting movement about the rotation axis 200X. This translational and/or pivotable connection, in combination with the coaxial arrangement of the shaft 200, the end portion 300, and the aperture 102A, in at least some embodiments and applications of the shaft assembly 101, allows the end portion 300 to self-center inside the shaft 200 during operation of the APU 100 and/or to absorb at least some expansions and/or contractions of the shaft 200 that may occur during use due to variations in temperature.

It is contemplated that in some embodiments, the end portion 300 could be fixed to the machine frame 102. It is also contemplated that in some embodiments, the end portion 300 could be made integral with and/or could otherwise be part of the machine frame 102. It is also contemplated that in some embodiments, the end portion 300 could be made rotatable relative to the machine frame 102 about the rotation axis 200X.

Still referring to FIG. 1, and in FIG. 2D, in the present embodiment, the end portion 300 further defines an air vent channel 306 therethrough along plane D-D shown in FIGS. 2A and 2D. The air vent channel 306 is at one end hydraulically connected to the axial channel 200A of the shaft 200 and at another end hydraulically connects either to a part of the lubricant cavity 104R that does not contain lubricant, to another container, or to atmosphere, depending on each particular embodiment and application of the APU 100. To this end, and now referring to FIGS. 1 and 2D, the air vent channel 306 includes an opening 306A defined in an end of the appendix 300A. The air vent channel 306 may be at a location that is assymetrical relative to the shape of the end of the appendix 300A.

The air vent channel 306 vents air that may from time to time be introduced into the axial channel 200A of the shaft, and in some embodiments pressurizes the air space to the left of the seal 310. Notably, in the present embodiment, the air vent channel 306 is defined through the end portion 300 separately from the the priming lubricant channel 304 and does not hydraulically connect to the the priming lubricant channel 304 via any point inside the end portion 300. It is contemplated that at least in some embodiments of the present technology, the air vent channel 306 could be omitted and/or may be defined through other parts of the APU 100/machine 100.

As can be seen from FIGS. 2A to 2D, in the present embodiment the channels 302, 304 and 306 are defined in the end portion 300 along different planes (B-B, C-C, and D-D, respectively) passing through the end portion 300. It is contemplated that in other embodiments, one or more of the channels 302, 304 and 306 may be axially in-line, and that in some embodiments channels 302 and 304 may hydraulically interconnect within the end portion 300.

In the present embodiment, the channels 302, 304 and 306 do not hydraulically interconnect to each other at any location inside the end portion 300. Also as can be seen from FIGS. 2A to 2D, in the present embodiment, the channels 302, 304 and 306 are defined by bores drilled into the end portion at respective locations, with plugs 300P, or other suitable elements, being subsequently inserted into parts of the bores to define the channels 302, 304, 306 as described in this document. It is contemplated that a different manufacturing method could be used. For example, it is contemplated that the end portion 300 may be manufactured with the channels 302, 304, 306 therethrough by additive manufacturing, in which embodiments the plugs 300P could be omitted.

Now referring to FIG. 3, an end portion 330 is shown. The end portion 330 is similar to the end portion 300 and features of the end portion 330 are labeled with the reference numerals of corresponding features of the end portion 300. A difference between the end portion 330 and the end portion 300 is that the end portion 330 defines a different helical feature 332. The helical feature 332 includes a cylindrical portion 332C that is larger in diameter than an intermediate portion 330M of the cylindrical appendix 330A of the end portion 330 that defines the opening 304B of the priming lubricant channel 304 therein. The cylindrical portion 332C of the helical feature 332 is smaller in diameter than the axial channel 200A of the first part 200' of the shaft 200 that the helical feature 332 is received in and thereby allows the first part 200' of the shaft 200 to rotate freely over the helical feature 332.

The cylindrical portion 332C defines at least one groove 332G therein. The at least one groove 332G is defined circumferentially around the cylindrical portion 332C and extends from an outer end 332A of the cylindrical portion 332C to an inner end 332B of the cylindrical portion 332C. In the present embodiment, the at least one groove 332G is helical in shape. In embodiments of the shaft assembly 101 that have the end portion 330, when the first part 200' of the shaft 200 rotates about the rotation axis 200X over the at least one groove 332G, the at least one groove 332G moves lubricant from the lubrication system 104, via the at least one groove 332G, into the axial channel 200A of the first part 200' of the shaft 200. The lubricant may thereafter flow via the axial channel 200A through additional channel(s) defined through the first part 200' of the shaft 200 to one or more components of the APU 100 requiring lubrication and/or cooling.

It is contemplated that in some embodiments and/or applications of the present technology, the helical feature 332 could be structured to pump/move lubricant in an opposite direction, from the axial channel 200A and out of the shaft 200 via the lubricant channel 302. It is contemplated that in some such embodiments, lubricant could recirculate from the lubricant cavity 104R back into the axial channel 200A of the shaft 200 upstream of the helical feature 332 via the return conduit 104RC, and could thereafter flow back to the helical feature 332 to again be pumped out of the shaft 200 and into the lubricant cavity 104R.

Figure 4:
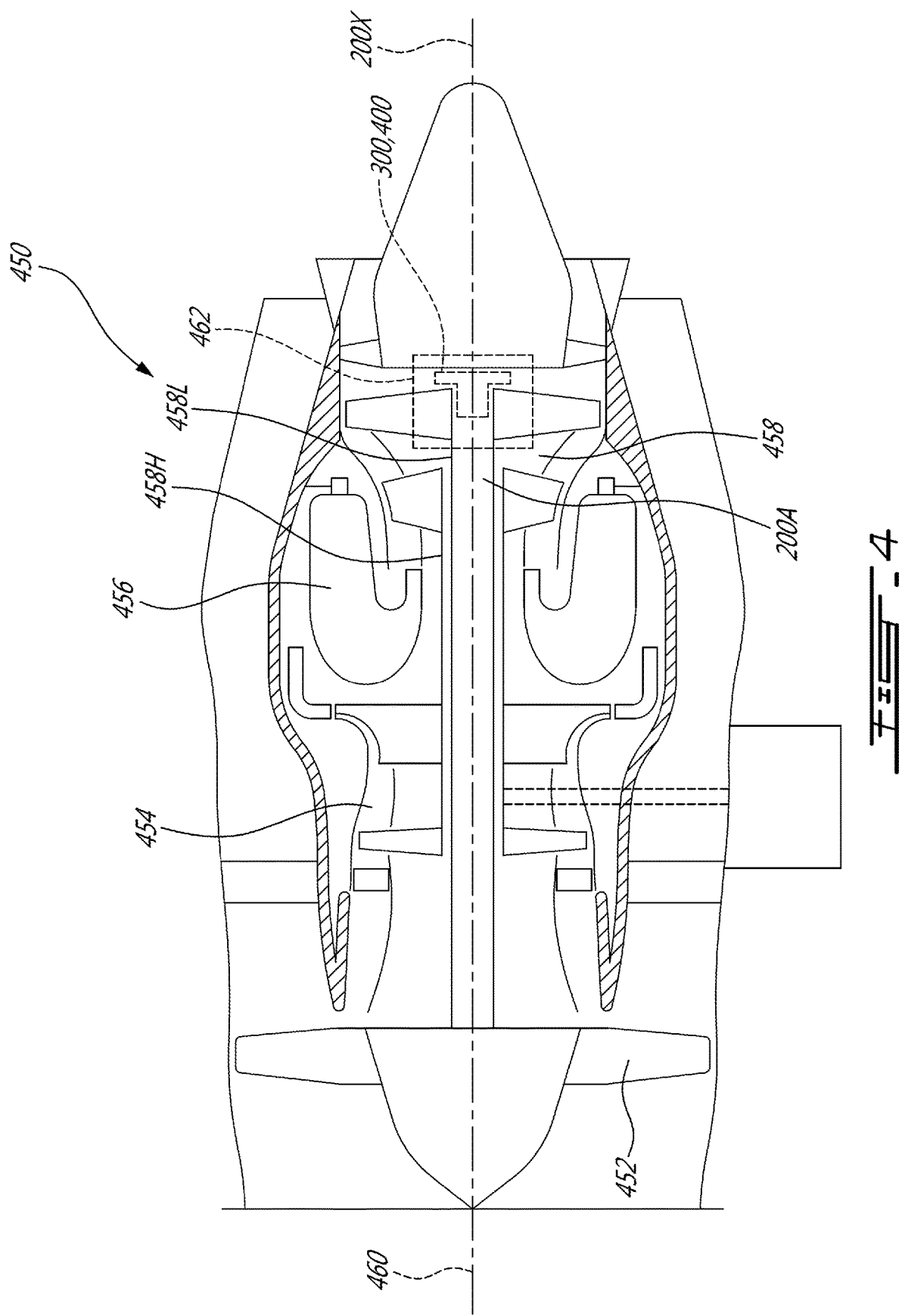
FIG. 4 is a schematic showing an aircraft engine, the engine comprising the shaft of FIG. 1.

Reference is now made to FIG. 4, which illustrates another contemplated use of the present technology. More particularly, FIG. 4 shows a turbofan aeroengine 450 of a type preferably provided for use in subsonic flight, generally comprising in serial flow communication a fan 452 through which ambient air is propelled, a compressor section 454 for pressurizing the air, a combustor 456 in which the compressed air is mixed with fuel and ignited for generating an annular stream of hot combustion gases, and a turbine section 458 for extracting energy from the combustion gases.

The turbine section 458 includes a low pressure shaft 458L that couples the turbine section 458 to the fan 452 to drive the fan 452, and a high pressure shaft 458H that couples the turbine section 458 to the compressor section 454 to drive the compressor section 454. Components of the engine 450, including the low pressure shaft 458L and the high pressure shaft 458H, are rotatable about a longitudinal center axis 460 of the engine 450.

In this embodiment, the engine 450 further includes a shaft assembly 462 according to the present technology. The shaft assembly 462 is similar to the shaft assembly 101 described above. Therefore, features of the shaft assembly 462 are labeled with the reference numerals of corresponding features of the shaft assembly 101. As shown, in this embodiment, the rotation axis 200X of the shaft assembly 462 is collinear with the longitudinal center axis 460 of the engine 450. It is contemplated that depending on the particular embodiment and application of the shaft assembly 462, this need not be the case.

A difference between the shaft assembly 462 and the shaft assembly 101 is that the shaft assembly 462 is part of the low pressure shaft 458L. As schematically shown in FIG. 4, it is contemplated that the shaft assembly 462 could use the end portion 300 or the end portion 400. It is contemplated that yet another embodiment of the end portion 300, 400 according to the present technology, such as an embodiment having a different type of helical feature, also could be used.

In the embodiment of FIG. 4, the engine 450 is the machine that includes the shaft assembly 462, the machine frame 102 that supports the end portion 300, 400 is a frame of the engine 450, the lubrication system 104 is a lubrication system of the engine 450, and the bearing assembly 108 is a bearing assembly (not shown) of the low pressure shaft 458L.

While in the contemplated example shown in FIG. 4 the present technology is used with respect to the low pressure shaft 458L of a turbofan engine, it is likewise contemplated that the present technology could also be used with respect to other one or more shafts of the engine 450 and/or with respect to one or more rotatable shafts of a different type of engine. For example, it is contemplated that the present technology may be used to provide one or more shafts of a turboprop aeroengine or a turboshaft aeroengine. While in FIG. 4 the end portion 300, 400 is shown as being used at a rear end of a shaft and at a rear part of an engine, it is contemplated that the end portion 300, 400 could instead be used at a front end of a shaft and/or at a front part of an engine.

The shaft assemblies 101, 462 of the present technology, and the related components and machine(s) in which the shaft assemblies may be used, may be constructed using known materials and manufacturing methods.

With the above embodiments in mind, the present technology provides a method of cooling a machine 100, such as the APU 100 or an electric generator.

For example, in some electric generator embodiments, the method includes operating the electric generator, with heat generated by the electric generator being transferred into a liquid in a liquid cooling system. As an example with regard to FIG. 1, element 100 may be the electric generator, and element 104 may be the liquid cooling system. The method may further include rotating the first part 200' of the shaft 200 of the electric generator 100 about the rotation axis 200X relative to a second part (e.g. the end portion 300) of the shaft 200, with the helical feature 308 being disposed between the first part 200' and the second part 300 to define the helical pump 200" between the first part 200' and the second part 300, and with the rotating the first part 200' causing the helical pump 200" to circulate at least some of the liquid (in the example above, oil) through the first part 200' of the shaft 200.

Further, in some embodiments, the rotating the first part 200' of the shaft 200 causes the helical pump 200" to circulate at least some of the liquid through the liquid cooling system 104.

Also in some embodiments, the method includes, before the rotating the first part 200' of the shaft 200, pressurizing at least part of the liquid cooling system 104 to move at least some of the liquid therefrom into an interface between the first part 200' and the second part 300 of the shaft 200 and thereby priming the interface.

As seen in the embodiments above, in some embodiments of the machine 100 and the shaft 200, the priming the interface includes supplying the at least some of the liquid into the interface via a channel 304 defined through the second part 300 of the shaft 200.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An electric generator machine comprising a liquid coolant system and a shaft, at least part of the shaft being rotatable about a rotation axis, the shaft including a first part having an axial channel therein, the axial channel including an opening in an end of the first part, the shaft including a second part received in the axial channel via the opening and engaged coaxially with the first part, the second part defining a liquid channel therethrough, the liquid channel hydraulically connecting the liquid coolant system to the axial channel, the liquid channel extending from an opening defined in a base of the second part to an opening defined in an appendix of the second part, the base at least in part disposed outside of the axial channel, the appendix disposed in the axial channel and defining a space between the appendix and an inner surface of the first part, the space being part of the axial channel, the opening defined in the appendix being open to the space, the first part being rotatable relative to the second part about the rotation axis with a helical feature disposed between the first part and the second part to define a helical pump between the first part and the second part, the helical pump being hydraulically connected to the liquid coolant system.

2. The electric generator machine of claim 1, wherein the helical feature includes a helical groove.

3. The electric generator machine of claim 1, wherein the helical feature includes a helical fin.

4. The electric generator machine of claim 1, wherein the liquid coolant system is a lubrication system of the machine, and the second part defines a priming lubricant channel therethrough that hydraulically connects the lubrication system to an outer surface of the second part at a location facing an inner surface of the first part.

5. The electric generator machine of claim 1, the second part defines an air vent channel therethrough, the air vent channel being at one end open to the axial channel and at another end being open at a location in the second part that is disposed outside of the first part.

6. The electric generator machine of claim 1, wherein the first part rotates about the rotation axis and the second part is stationary about the rotation axis, the helical feature disposed on the second part, the helical feature being at least one of a helical groove and a helical fin.

7. The electric generator machine of claim 1, wherein the space is seal-free and bearing-free.

8. The electric generator machine of claim 1, wherein the helical feature is disposed at least in part inside the space, and the helical feature includes at least one of a helical groove and a helical fin.

9. The electric generator machine of claim 1, wherein the space extends from the helical feature toward the base of the second part, the base being disposed at least in part outside of the first part, and the shaft further includes a seal that hydraulically seals the space at a location between the helical feature and the base.

10. The electric generator machine of claim 1, wherein the liquid channel is blocked at one end thereof with a plug inserted therein.

* * * * *